United States Patent Office.

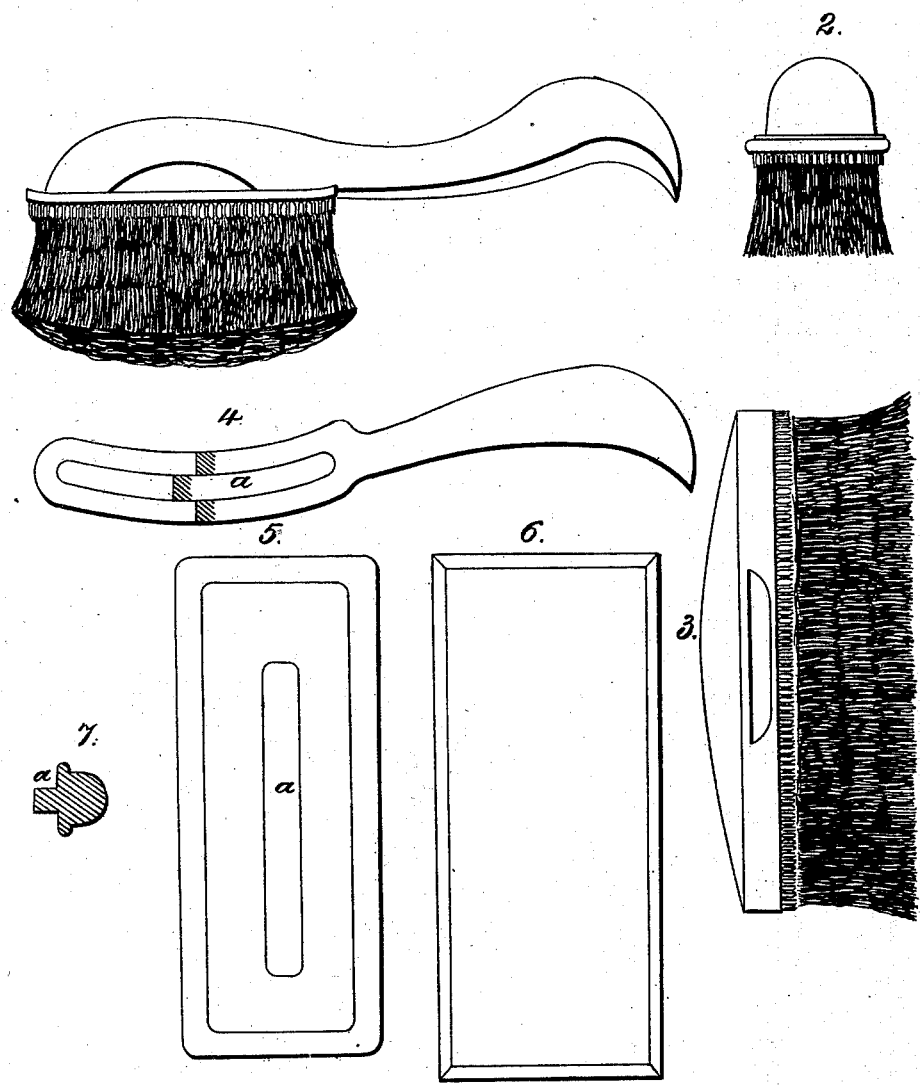

ABRAM VANDUSEN, OF CHICAGO, ILLINOIS.

BRUSH.

Specification forming part of Letters Patent No. 49,457, dated August 15, 1865.

*To all whom it may concern:*

Be it known that I, ABRAM VANDUSEN, of the city of Chicago, county of Cook, and State of Illinois, have invented a new and Improved Brush for Clothes and Dusting; and I do hereby declare that the following is a full, true, and exact description of my invention, reference being had to the accompanying drawings, and to the letters and figures marked thereon.

I employ the cloth made from whalebone, known as the "whalebone hair-cloth," cutting the same into strips of about two inches in width, which strips are seven yards in length for a brush with a flange or part around which the material is wound, as hereinafter described, being about six (6) inches in length and one-half inch in width, the width and length of the strips depending on the size of the brush one may wish to make, and then unraveling the strip of cloth lengthwise, leaving about one-half inch in width for a margin, the width of the margin depending on the width of the flange or part around which the material is wound, taking from the part or portion unraveled any cotton or other material which may be interwoven with the whalebone, leaving nothing but the whalebone for the brush. I then take a handle, which may be of the shape of those described in Figs. 1, 2, and 3, which may be made from blank or board which may be about two (2) inches in thickness, marking out the form and size desired on the plank or board, and then cutting the same so as to form the flange or part marked A in Figs. 4 and 5, which show the flange or the knob marked A in Fig. 7, and then dress and polish the wood. I then take the cloth, prepared as before stated, and fasten the same by the margin to the sides of the flange or the knob or part A, described in Figs. 4, 5, and 7, first coating the sides of this flange or the knob with glue, so as to make the brush firm, and when the cloth is placed upon it a few small tacks may be also used, then coating that part of the margin which is wound around the flange or around the knob with glue, then winding the margin around the flange lengthwise, or around the knob, coating every coil, and then winding, putting in, if desired, a few small tacks; and when the material is wound entirely around this flange, or around the knob, put a piece of gimp or morocco or any suitable material around the margin thus wound around the flange or around the knob, thus making the brush firm and strong, Figs. 1, 2, and 3 being representations of a brush complete. I then trim the brush so as to make it even. Fig. 6 represents the top of a handle of a brush made in that shape.

The material to which the cloth is attached to form the brush may be, if desired, circular, with a knob around which the margin may be wound, Fig. 7 showing the knob, and Fig. 2 being a brush with a knob complete. I thus make a perfectly strong and durable brush, much more so than the brushes now made from bristles or other materials, as there is not that chance or likelihood of the former giving out as there is in the latter, and the handle is solid, and there is no perforation of the wood required, as in brushes now in use made with bristles.

This brush may be used on goods of the finest texture without injuring the same. I consider the brush made from the whalebone hair-cloth much better than that made from hair cloth.

Thus, having described my invention, what I claim, and desire to secure by Letters Patent, is—

A brush made by the employment of whalebone hair-cloth, and combined with any suitable material having a flange or knob, as above described.

ABRAM VANDUSEN.

Attest:
O. P. ABERCROMBIE,
GEO. P. BELLOWS.